(12) United States Patent
Van Laere

(10) Patent No.: US 6,782,659 B2
(45) Date of Patent: Aug. 31, 2004

(54) FLOWER POT ASSEMBLY

(75) Inventor: Guy Victor Van Laere, Beervelde-Lochristi (BE)

(73) Assignee: Russell Weiss, Center Moriches, NY (US)

( * ) Notice: Subject to any disclaimer, the term of this patent is extended or adjusted under 35 U.S.C. 154(b) by 0 days.

(21) Appl. No.: 10/199,617

(22) Filed: Jul. 17, 2002

(65) Prior Publication Data

US 2003/0033752 A1 Feb. 20, 2003

Related U.S. Application Data

(62) Division of application No. 08/726,159, filed on Oct. 4, 1996, now Pat. No. 6,421,959.

(30) Foreign Application Priority Data

Oct. 5, 1995 (BE) .............................................. 9500827

(51) Int. Cl.[7] ........................... A01G 9/02; A01G 27/02
(52) U.S. Cl. ................................................. 47/84; 47/79
(58) Field of Search ............................. 47/65.7, 79, 75, 47/81, 84

(56) References Cited

U.S. PATENT DOCUMENTS

| | | | | |
|---|---|---|---|---|
| 3,733,746 A | | 5/1973 | Allen, Jr. | |
| 3,804,331 A | * | 4/1974 | Levey | 239/59 |
| 4,241,537 A | * | 12/1980 | Wood | 47/77 |
| 4,995,192 A | * | 2/1991 | DeWid | 47/30 |
| 5,022,182 A | * | 6/1991 | Anderson | 47/48.5 |
| 5,044,120 A | * | 9/1991 | Couch | 47/79 |
| 5,094,060 A | * | 3/1992 | Caird | 53/390 |
| 6,421,959 B1 | * | 7/2002 | Van Laere | 47/79 |

FOREIGN PATENT DOCUMENTS

| | | | | |
|---|---|---|---|---|
| CH | 656287 | * | 5/1982 | .......... A01G/31/02 |
| DE | 2925150 | * | 1/1981 | ........... A01G/9/02 |
| DE | 3700108 | | 7/1988 | |
| FR | 2691875 | * | 12/1993 | ........... A01G/9/10 |
| JP | 401124333 | * | 5/1989 | ........... A01G/9/10 |
| JP | 4-8234 | * | 1/1992 | .................... 47/81 |
| JP | 4008234 | | 1/1992 | |
| NL | 8202349 | * | 1/1984 | ................ 47/81 N |

* cited by examiner

Primary Examiner—Son T Nguyen
(74) Attorney, Agent, or Firm—Galgano & Burke, LLP

(57) ABSTRACT

A flower pot assembly for keeping at least one plant temporarily alive without having to water it, includes a pot permeable to water in which the plant is potted with the required amount of soil, and a container impermeable to water in which the pot is received, so that a space is formed between the pot and the container. A gel formed of a water-absorbing polymer and water at least partially fills the space between the pot and the container. The container and gel are used as a packaging for the potted plant in order to keep this plant alive without having to water it during transport and when put on display for sale.

9 Claims, 3 Drawing Sheets

FLOWER POT ASSEMBLY

RELATED APPLICATION

This application is a divisional application of U.S. Ser. No. 08/726,159, filed Oct. 4, 1996 which is now U.S. Pat. No. 6,421,959, issuing on Jul. 23, 2002, the subject matter of which is incorporated herein by reference thereto.

BACKGROUND OF THE INVENTION

The present invention relates to a flower or plant pot assembly and method employing the same for keeping one or several plants temporarily alive in soil. More particular, it relates to such a flower pot assembly used during transport and for display of potted flowers or plants while they are put on sale, and which includes a pot filled with soil in which the plant is potted.

Plants, of course, need water in order to stay alive, look good, and remain healthy. Plants which are maintained in an open air environment especially need to be frequently watered. The watering of plants during transport and even while they are put on display for sale in, e.g., a flower shop is difficult or even impossible. Also, after a long transport, plants often look wilted or even may have died.

In order to prevent the soil from drying out too much, the plants are conveyed in pots. Typically, they are already cultivated in pots and these pots are consequently used during transport. At the end user's, the plants can be kept in these pots for a while.

Various techniques have been proposed to keep potted plants alive for a certain period of time without the need to water them. A much applied technique involves mixing the soil in which the plants are put with a product which can very efficiently absorb liquid, i.e., water, and can gradually release or give off the liquid, i.e., water, to the roots of a plant as this plant requires water.

A very serious disadvantage of this technique is that the potted plants usually stand at the nursery or distributor for a certain time before being shipped to the customer, very often standing in the open air. Under these circumstances, the required amount of water needed for the "mixture", which consists of soil and the water absorbing and slow-releasing product in which the plant is put, is entirely different under wet and dry weather conditions.

Another disadvantage of the above-mentioned technique is that this product is relatively expensive and a large amount of it is required in order to obtain a mixture which provides the desired moisture absorption and slow moisture release.

Another technique to temporarily provide a plant with the necessary water without having to water it is described in German published patent application no. DE-A-2.925.150. This patent discloses a container or other vessel which is impermeable to water in which is received a water permeable pot containing the plant. Clay grains, in particular expanded clay grains, which serve to absorb water and release it gradually are provided between the pot and the container.

However, water-absorbing power of the clay grains is limited. Consequently the required volume of clay grains is very large, and usually even larger than the volume of soil in the pot. As a result, the container must be considerably larger than the pot with the plant, which is not only unaesthetic, but which also significantly increases the costs of transport per plant. Moreover, it undesirably requires greater display space when put on sale.

Furthermore, if this container-pot assembly falls over, the clay grains may fall out of the container. In order to prevent this, a lid must be placed on the container and the clay grains, which is time-consuming and expensive. It is also difficult to determine the required amount of water, so that water often remains on the bottom of the container, which is harmful to the plant roots. Consequently, this technique is only suitable for use by the consumer, and is not suitable for use during transport.

The use of water-absorbing polymers for keeping plants temporarily alive is also known in the prior art; see, e.g., "Patent Abstracts of Japan" Vol 13, No. 227 (C-600). However, these polymers are provided on the inside of the pot and they are only separated from the soil by means of a net. It is difficult to cultivate plants directly in such a pot with the polymer applied in this manner. Repotting the plant in such a pot immediately before transport is time-consuming, and increases the risk that the plant will die.

SUMMARY OF THE INVENTION

Accordingly, it is an object of the present invention to provide a novel flower pot assembly and method employing the same for keeping one or several plants in soil temporarily alive, which totally avoids the above-mentioned and other disadvantages.

It is a more particular object of the present invention to provide such an assembly and method, which eliminates the need to water the plants during transport and when placed on display and sale.

It is also an object of the present invention to provide a method for packaging one or several plants, for transport and sale, especially when these plants are already potted in a soil-filled pot.

It is a further object of this invention to package one or several plants in a pot in an economical manner and without significantly increasing the costs of transportation or making it difficult to put the plants on display for sale, such that, during transport and display for sale, the plants are kept alive and remain fresh without having to water them.

These and other related objects are achieved according to the invention by the provision of flower or plant pot assembly for keeping one or several plants temporarily alive without having to water them. The assembly includes a water-permeable pot filled with the required amount of soil in which one or more plants are potted or stand, and a water impermeable-container or vessel in which the above-mentioned pot is received, so that a space is formed between the pot and the container. The space between the pot and the container is at least partially filled with a gel formed of a water-absorbing polymer and water. In proportion to the amount of water, the gel takes up relatively little space. The plant placed in the soil in the water permeable pot can take up water from the gel for a long period of time, so that watering this plant is not immediately necessary. The pot and the container, together with the gel, form a package for the plant and soil which, especially during transport and when put on display for sale, maintains the plant very well without it having to be watered.

One advantage of this assembly is that the containers and the water-absorbing polymer may be provided before the plants are shipped to the customer, and one can estimate precisely or predetermine the effective amount of water which should be added to or poured on the polymer to effect proper watering of the plant during transport and display. Another advantage is that the required amount of polymer is five times less than in case the polymer is directly mixed with the soil as in certain prior art techniques.

According to the invention, the pot may be permeable to water because it is porous, e.g., it could be made of burnt clay, or because it is provided with openings, in which case it may be made of plastic. Water-absorbing polymers are suitable for the gel which are capable of absorbing 30 to 700 times their own weight of distilled or de-ionized water.

Certain of the foregoing and related objects are also attained in accordance with the present invention by the employment of a method for keeping plants temporarily alive without watering them, by application and use made of the above-noted flower pot assembly. The method includes the step of putting a pot in which these plants are potted in soil in a somewhat larger container or receptacle, so that a space is created between the pot and the container. A gel is then formed of a water-absorbing polymer and water in the space between the pot and the container. This can be accomplished, on the one hand, by putting a quantity of the solid polymer in the container before or after the pot is placed in the container and by putting a quantity of water in the container or, on the other hand, by putting a suspension of the polymer in water in said container.

As a result, these potted plants may come already potted directly from the nursery where these plants were grown, i.e., in the "last" pots in which they were grown and cultivated at the nursery without the same needing to be re-potted. The pots may even be packaged in the above manner at the growers before their transport to the intended customers.

Preferably, a predetermined amount of water is used such that the polymer is practically saturated with water. Most, desirably, the amount of polymer and water are dosaged such that the gel reaches almost to the top edge of the pot.

DETAILED DESCRIPTION OF THE PREFERRED EMBODIMENTS

Figure 1:
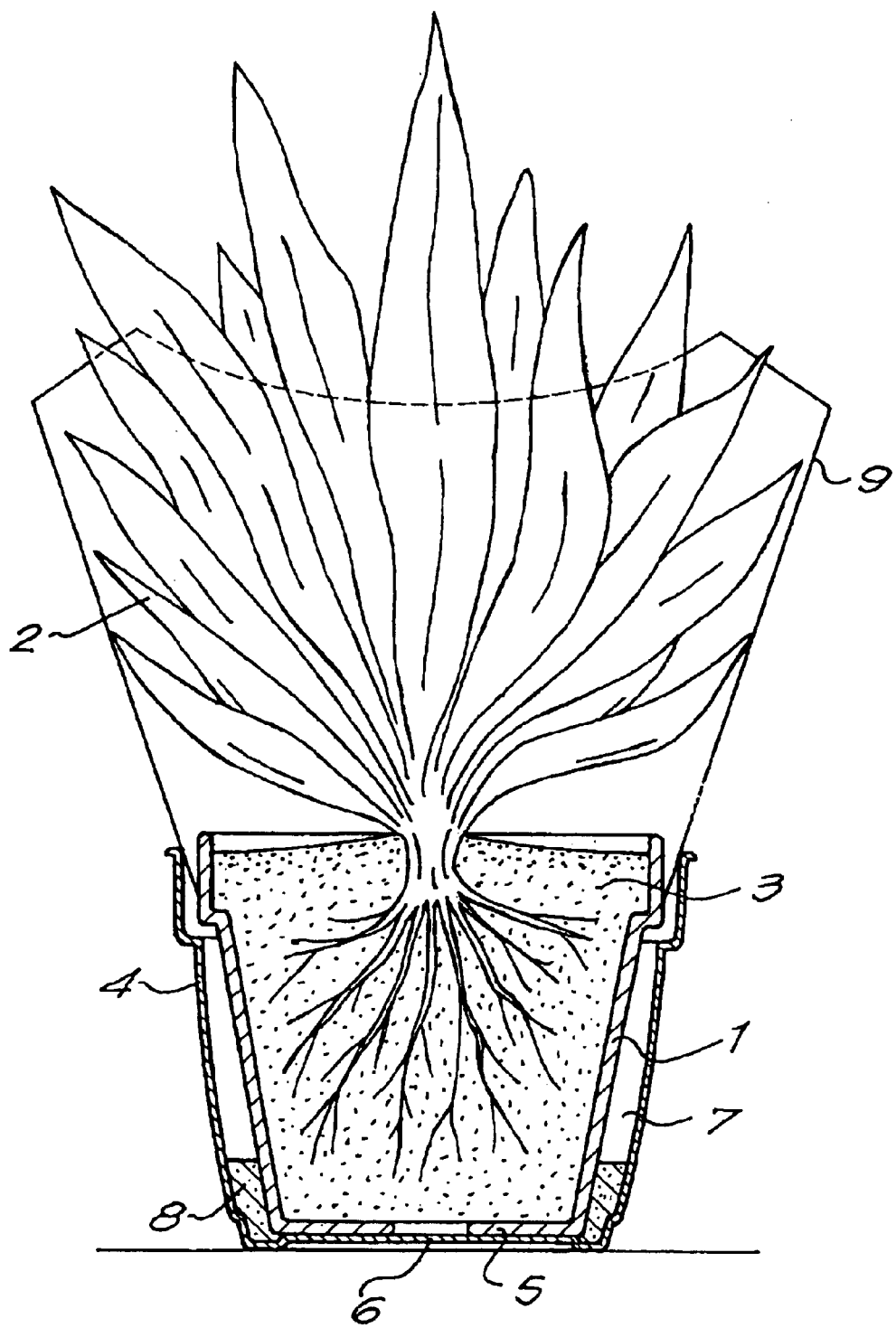
FIG. 1 is a sectional view of a flower pot assembly according to the invention in which a potted plant is received.

Turning now in detail to the drawings and, in particular FIG. 1 thereof, therein illustrated is a flower or plant pot assembly embodying the present invention which includes a pot 1 for packaging a plant 2. Pot 1 is made of a material permeable to water, e.g., burnt clay. Plant 2 is potted in pot 1 together with the required amount of soil 3. The assembly further includes a pot-or-cup shaped outer container, receptacle or vessel 4 which is made of a material impermeable to water, e.g., of plastic, and in which pot 1 is received.

Pot 1 has a base or bottom wall which rests on the base or bottom wall 6 of the outer container 4, such that a space 7 is formed between pot 1 and container 4. A gel 8 at least partially fills the space 7 and is formed of water and a water-absorbing polymer which, on the one hand, can very efficiently absorb water and, on the other hand, subsequently give it off or release it gradually.

This water-absorbing polymer preferably is a polymer which is capable of absorbing 30 to 700 times its own weight of distilled or de-ionized water. Suitable polymers of this type include, e.g., starch/acrylonitrile inoculated copolymers, neutralized cross-linked starch/acrylic acid copolymers, neutralized cross-linked starch/acrylic acid copolymers, cross-linked sodium polyacrylate, cross-linked polyethylene oxide, vinyl acetate/unsaturated carboxylic acid copolymer, cross-linked polyacrylamide and cross-linked copolymers of acrylamide and acrylic acid neutralized as sodium or potassium salt and/or combinations thereof. A particularly suitable polymer is marketed, e.g., by Allied Colloids under the trademark Alcosorb 400.

These polymers are typically in the form of solid white crystals and are of such a nature that, when these polymers are mixed with water in a correct proportion, these polymers absorb the water entirely, to form a relatively thick gel in about one to three hours. This gel is capable of gradually releasing or giving off the absorbed water to the plant as needed.

Preferably, the flower pot assembly further includes a decorative cover 9 which closes off the space 7 with its bottom edge, so that water loss from space 7 as a result of evaporation is eliminated or minimized. Cover 9 is preferably glued to container 4.

Water-permeable pot 1 is, optionally, made of a material which is impermeable to water, such as plastic. In this case, the space 7 in which the water-absorbing polymer is introduced will be preferably formed between bottom wall 5 of pot 1 and bottom wall 6 of the outer container 4 which is also made of a material which is impermeable to water. In order to maintain this space, ribs (not shown) can, e.g., be provided on the outside of the bottom wall 5 and/or on the inside of the bottom wall 6. Moreover, holes can be provided in bottom wall 5 of pot 1 to allow plant 2 to absorb the required amount of water from gel 8 which is formed or introduced into space 7 between bottom wall 5 of pot 1 and bottom wall 6 of container 4.

The flower pot assembly is used in a method embodying the present invention for packaging a plant 2 received in pot 1 with the required amount of soil 3 in order to keep plant 2 alive and in good shape without having to water it for a long time, especially during transport and when put on display for sale. The method of operation is as follows:

(1) pot 1, filled with soil 3 and in which plant 2 is potted, is placed into outer container 4 and the space 7 between pot 1 and container 4 is filled at least partially with the water-absorbing polymer;

(2) subsequently, a suitable quantity of water is poured onto the polymer in space 7 and a decorative cover 9 may be provided in such a manner that this cover closes off space 7 with its bottom edge; and (3) during the following period of one to three hours, all the water that is poured in will be absorbed by the polymer, whereby a relatively thick gel is formed.

As a result of this innovative packaging technique, during transport and while on display for sale, gel 8 gradually releases the water which migrates through pot 1 (which is permeable to water), through soil 3 of pot 1, and to the roots of plant 2 which will absorb the water as required.

Instead of separately introducing the water-absorbing polymer and then the correct amount of water in space 7, a suspension of the polymer in water can be made beforehand, after which it is then introduced into space 7. Alternatively, both the water and the polymer can be provided simultaneously in a predetermined dosage or correct proportion in space 7.

According to yet another embodiment of the method, the polymer and possibly even the water may be introduced into container 4 before pot 1 containing the plant 2 is placed in it. The gel 8 may already be formed, in which case pot 1 can be pressed in this gel 8 which is then pushed up around pot 1.

All of these embodiments of the method can be carried out by the grower, e.g., immediately before shipping the plants 2 to his customers. Pot 1 preferably is the "nursery" pot in this case, i.e., the pot in which the plant 2 has last been cultivated by the grower, either in a greenhouse or in an open air environment.

Figure 2:
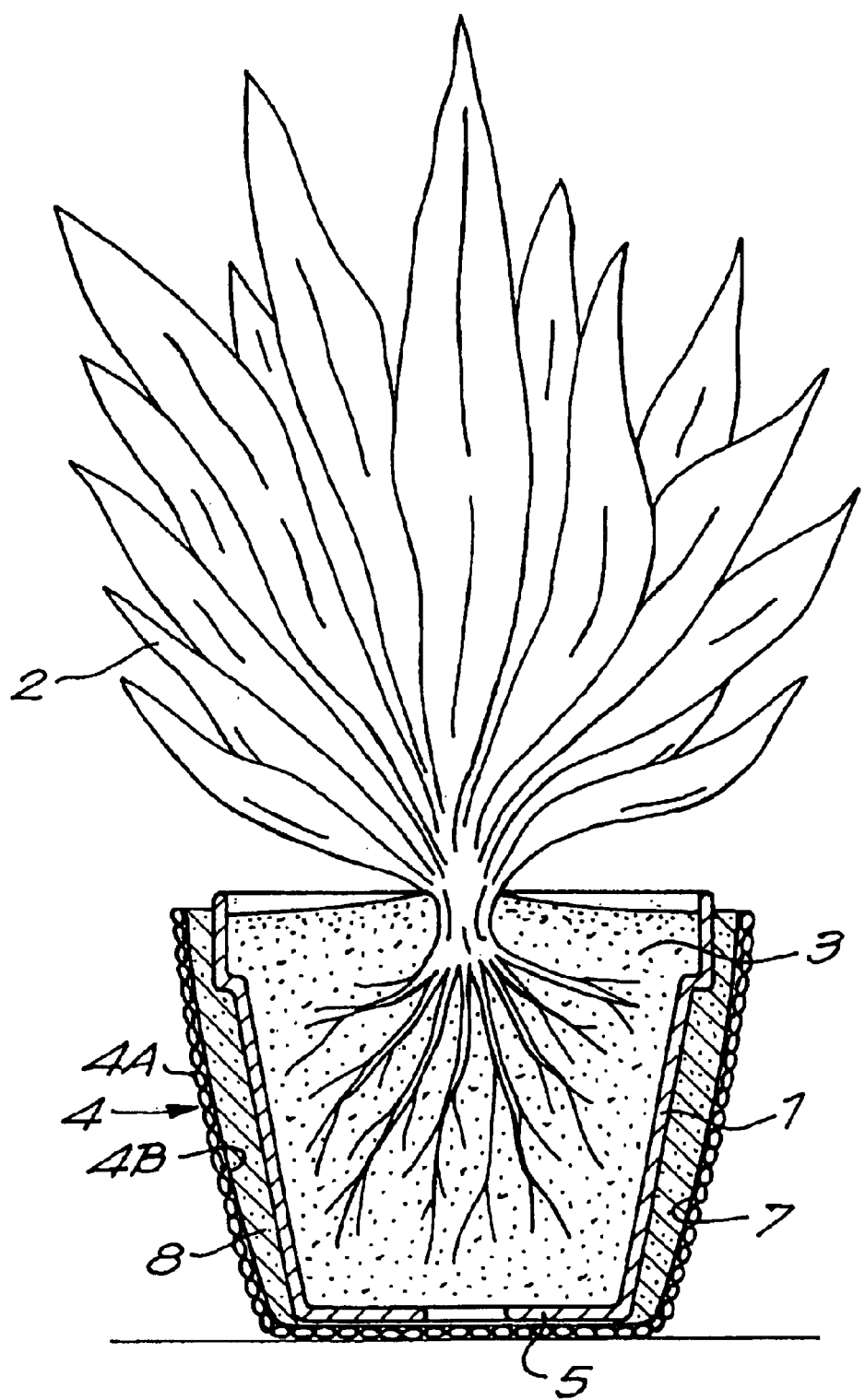
FIG. 2 is a sectional view comparable to that of FIG. 1, but illustrating a second embodiment of the flower pot assembly according to the invention.

The embodiment of the flower pot assembly in FIG. 2 differs from the FIG. 1 embodiment in that outer container 4 is in the form of a wicker basket 4A having an inside surface which is covered with a waterproof foil 4B. In addition, gel 8 reaches to almost the top edge of the outer container 4 which extends somewhat over pot 1. In this embodiment no decorative cover 9 is employed.

The method of operation for packaging a pot 1 with this second embodiment of the flower pot assembly is analogous to the above-described methods, with the exception that no decorative cover 9 is provided and that the quantity of water-absorbing polymer is accurately dosed such that, after an absorbable amount of water has been added, and preferably about the maximum amount which can be absorbed, the space 7 is filled almost entirely. This prevents too much water from being added to the polymer.

Figure 3:
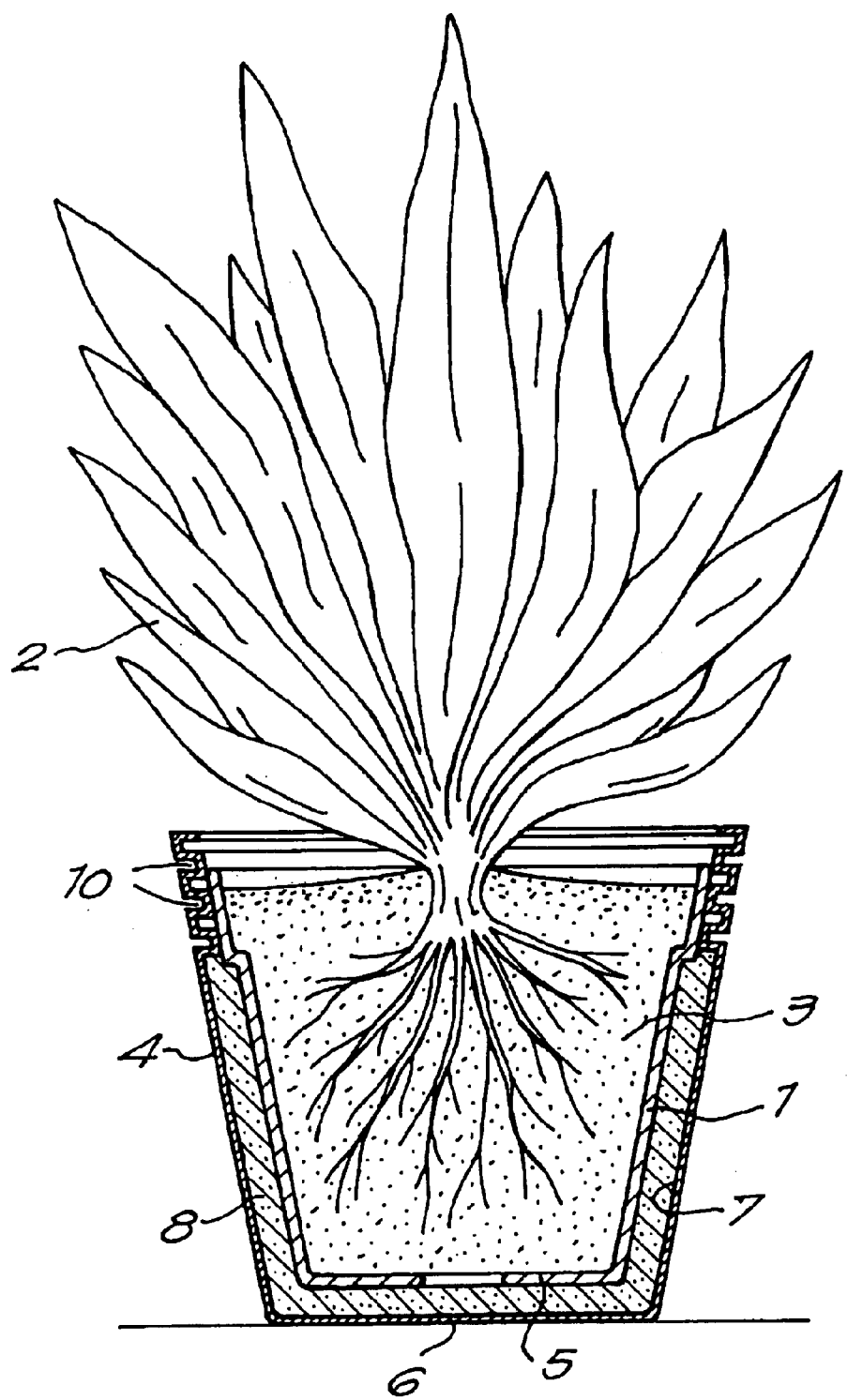
FIG. 3 is a sectional view comparable to that of the FIGS. 1 and 2, but illustrating a third embodiment of the flower pot assembly according to the invention.

FIG. 3 illustrates a third embodiment of the flower pot assembly which differs from the preceding embodiments in that there is no cover and outer container 4 extends to the top side of pot 1 or even higher and has a plurality of parallel ribs 10 on the inside of its top rim which extend around the entire periphery of container 4 and of which at least one rib abuts the outside surface of the top rim of pot 1 placed in it. As a result, space 7 is practically closed off at the top and the evaporation of water from gel 8, which reaches almost to the top of pot 1, and actually to these ribs 10, is reduced.

Ribs 10 are preferably provided in a slightly tapered part of the container 4, narrowing towards the bottom. At least the top edge of the pot 1 is also preferably somewhat tapered as well.

This container 4 is preferably made of plastic with a very small thickness, of for example 0.2 mm, in which case the above-mentioned ribs 10 can be made in the form of a corrugation of the plastic wall of the container, as is shown in FIG. 3. The ribs 10 may be somewhat elastically deformable in this case to provide a snug or tight fit.

The method of operation for employing this third embodiment is also analogous to the above-described methods, but because the ribs 10 close off the space 7, the water-absorbing polymer and the water must, of course, be supplied to container 4 before the pot 1 is inserted into container 4.

Preferably, pot 1 is only put in place after the gel 8 has been formed. Due to the weight of this pot 1 with plant 2 and the soil 3, it will penetrate into gel 8 and push away at least a part thereof around pot 1. As a result, pot 1 can be suspended on the ribs 10 or rest with its lower base or bottom wall 5 on gel 8 or on bottom wall 6 of container 4.

The quantity of the polymer and the water is predetermined to ensure that the gel 8 practically reaches up to ribs 10. The container 4 and the gel 8 can be removed by the end user, but this is not necessary. Container 4 may be possibly provided with a decoration or the end user may place the container 4 in a somewhat bigger decorative pot or wicker basket or the like.

Thus, while only several embodiments of the present invention have been shown and described, it is obvious that many changes and modifications may be made relative thereto without departing from the spirit and scope of the invention.

What is claimed is:

1. A flower pot assembly for keeping at least one plant temporarily alive without having to water it, comprising:
    a water-permeable rigid pot filled with soil and a potted plant;
    a water-impermeable rigid container in which said pot is received and which is configured and dimensioned such that it is only slightly greater in size in relation to said pot and so that a soil and clay-free space is formed between said pot and said container; and
    a gel solely and at least partially filling said space between said pot and said container consisting essentially of a water-absorbing polymer and water which gel releases said water gradually over time to effect watering of said plant during transport and display thereof, said gel in said space between said container in said pot defining a volume which is less than the volume of said soil in said pot.

2. The assembly according to claim 1, wherein said pot is made of a material which is permeable to water.

3. The assembly according to claim 1, wherein said pot is made of a material which is impermeable to water, and is formed with at least one hole.

4. The assembly according to claim 1, wherein said container comprises a wicker basket, the inside of which is covered with a watertight foil.

5. The assembly according to claim 1, wherein said container is made of plastic.

6. The assembly according to claim 5, wherein said container has a top rim and a plurality of ribs extending about the periphery of said top rim, at least one of which abuts said pot to close off said space.

7. The assembly according to claim 1, wherein said water-absorbing polymer can absorb 30 to 700 times its own weight of water.

8. The assembly according to claim 1, wherein said water-absorbing polymer is a member selected from the group consisting of a starch/acrylonitrile inoculated copolymer, a neutralized cross-linked starch/acrylic acid copolymer, a cross-linked sodium polyacrylate, a cross-linked polyethylene oxide, a vinyl acetate/unsaturated carboxylic acid copolymer, a cross-linked polyacrylamide and a cross-linked copolymer of acrylamide and acrylic acid neutralized as sodium or potassium salt and a combination thereof.

9. The assembly according to claim 1, additionally including a decorative cover having a bottom edge which closes off said space with said bottom edge, so that water loss from said space as a result of evaporation is minimized.

* * * * *